United States Patent Office 3,647,789
Patented Mar. 7, 1972

---

3,647,789
CEPHALOSPORANIC ACIDS
Leonard Bruce Crast, Jr., Clay, N.Y., assignor to
Bristol-Myers Company, New York, N.Y.
No Drawing. Filed Nov. 13, 1969, Ser. No. 876,596
Int. Cl. C07d 99/24
U.S. Cl. 260—243 C        11 Claims

ABSTRACT OF THE DISCLOSURE

Certain 7-[α-(2,6-dihalo-4-pyridylthio)acetamido]cephalosporanic acids and derivatives thereof have shown pronounced antibacterial activity against gram-positive and gram-negative bacteria and in particular the acid-fast bacteria, Mycobacterium tuberculosis H37Rv. A preferred compound, 7-[α-(2,6-dichloro-4-pyridylthio)acetamido]cephalosporanic acid is prepared by the condensation of 2,6-dichloro-4-mercaptopyridine with 7-(α-bromoacetamido)cephalosporanic acid.

BACKGROUND OF THE INVENTION

(1) Field of the invention

This invention relates to chemical compounds useful as antibacterial agents in the treatment of infectious diseases caused by gram-positive and gram-negative bacteria in mammals, and particularly in man. There exists a need to provide alternative and improved agents for the treatment of infections caused by bacteria, or for the decontamination of objects bearing such organisms, e.g., hospital equipment, etc. Most particularly desirable is the provision of an alternative antibiotic to dihydrostreptomycin, a drug of choice in the treatment of tuberculosis. The compounds of this invention appear to provide this choice.

(2) Description of the prior art 4-pyridylthioacetamidocephalosporins are not entirely new in the art of cephalosporins. However, none of these compounds are reported to be agents for use against tuberculosis. In fact, it now appears that only those compounds 2,6-dihalosubstituted in the 4-pyridyl moiety have significant anti-tubercular activity. Compounds related to those of the present invention include:

(A) Japanese Patent No. 16952/66, issued Sept. 26, 1966. The patent discloses the compounds

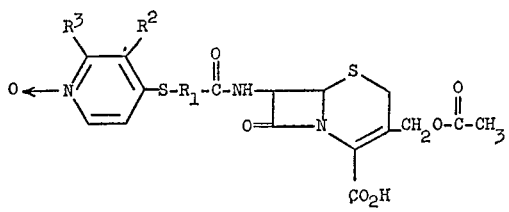

wherein $R^1$ is (lower)alkylene, $R^2$ and $R^3$ are H, (lower)alkyl or together are —(CH=CH)$_2$—.

(B) United States Patent No. 3,422,100, issued Jan. 14, 1969 discloses the compounds

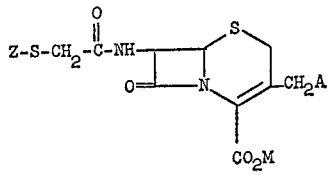

in which Z is 3 or 4 pyridyl, A is hydrogen, azido, hydroxyl, (lower)alkanoyloxy, benzoyloxy, a quaternary ammonium radical or, when taken together with M, a monovalent carbon-oxygen bond; and M is hydrogen, a pharmaceutically acceptable nontoxic cation, an ionic charge when A is the quaternary ammonium radical or, when taken together with A, a monovalent carbon-oxygen bond.

None of the compounds of the closest prior art disclose halosubstituted pyridylthioacetamidocephalosporins nor suggest their activity as potent anti-tubercular agents.

SUMMARY OF THE INVENTION

The 7-[α-(2,6-dihalo-4-pyridylthio)acetamido]cephalosporanic acids or derivatives thereof of the present invention are compounds having the formula

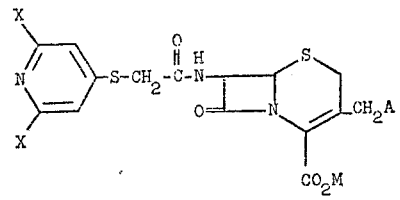

wherein X is fluoro or chloro, A is hydrogen, azido, (lower)alkanoyloxy, or benzoyloxy; and M is hydrogen, or a pharmaceutically acceptable nontoxic cation.

COMPLETE DISCLOSURE

This invention relates to new synthetic compounds of value as antibacterial agents, as nutritional supplements in animal feeds, as agents for the treatment of mastitis in cattle, and as therapeutic agents in poultry and animals, including man, in the treatment of infectious diseases caused by gram-positive and gram-negative bacteria, and particularly the acid-fast bacteria, Mycobacterium tuberculosis.

It was a further object of the present invention to provide cephalosporins active against gram-positive and gram-negative bacteria which are also efficiently absorbed upon parenteral or oral administration to man and animals.

The objects of the present invention have been achieved by the provision, according to the present invention, of the compounds of the formula

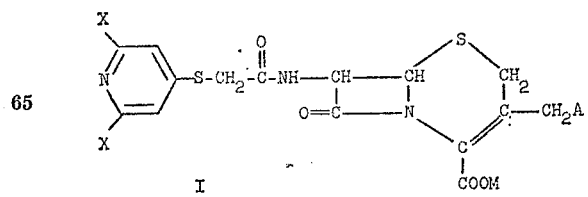

in which X is fluoro or chloro, A is hydrogen, azido, lower)alkanoyloxy containing 2 to 8 carbon atoms, e.g., acetoxy, propionoyloxy, butanoyloxy, pentanoyloxy, etc., or benzoyloxy; and M is hydrogen or a pharmaceutically acceptable nontoxic cation.

For illustrative purposes, shown below is the formulae of the compound when, in Formula I: X is chloro, A is acetoxy and M is H (II); X is chloro, A is azido and M is Na (III); X is fluoro, A is H and M is H (IV).

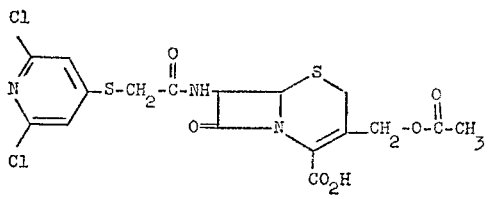

II

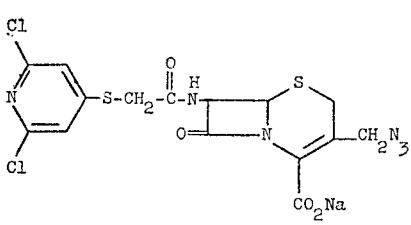

III

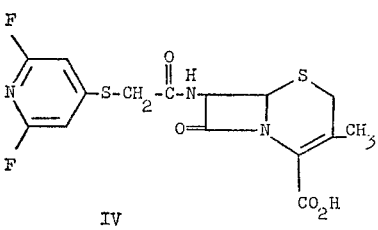

IV

A preferred embodiment of the present invention is the group of compounds having the formula

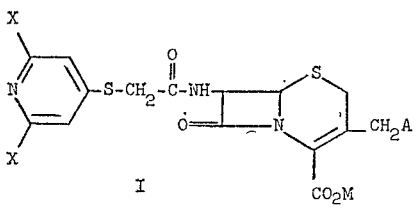

I in which X is fluoro or chloro, A is hydrogen, azido, (lower)alkanoyloxy or benzoyloxy; and M is hydrogen or a pharmaceutically acceptable nontoxic cation; or a pharmaceutically acceptable nontoxic acid addition salt thereof when M is hydrogen.

Another preferred embodiment of the present invention is the group of compounds having the formula

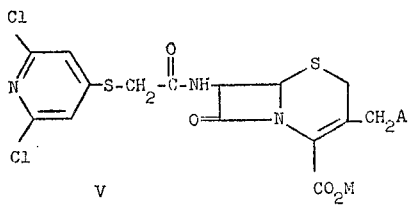

V in which A is hydrogen, azido, or acetoxy; M is hydrogen or a pharmaceutically acceptable cation.

A more preferred embodiment is the compound of Formula V in which A is hydrogen or azido.

A most preferred embodiment is the compound of Formula V in which A is acetoxy and M is hydrogen; or the sodium or potassium salt thereof.

Another preferred embodiment of the present invention is the group of compounds having the formula

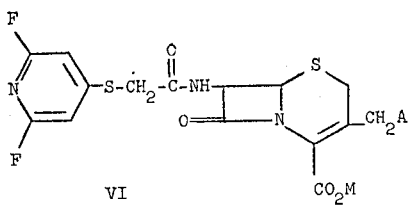

VI in which A is hydrogen, azido, or acetoxy; M is hydrogen or a pharmaceutically acceptpable cation.

A further preferred embodiment is the compound of Formula VI in which A is hydrogen or azido.

A most preferred embodiment is the compound of Formula VI in which A is acetoxy and M is hydrogen, or the sodium or potassium salt thereof.

The pharmaceutically acceptable, nontoxic cations include metallic cations such as sodium, potassium, calcium and aluminum and organic amine cations such as trialkylamines, e.g., triethylamine, procaine, dibenzylamine, N-benzyl-$\beta$-phenethylamine, 1-ephenamine, N,N' - dibenzylethylenediamine, dehydroabietylamine, N,N'-bis-dehydroabietylethylenediamine, N-(lower)alkylpiperidines, e.g., N-ethylpiperidine, and other amines which have been used to form salts with benzylpenicillin.

As the compounds of the present invention are capable of forming salts with acids due to their basic nitrogen function, the compounds are in a sense amphoteric and include the nontoxic acid addition salts thereof (i.e., the amine salts) including the mineral acid addition salts such as the hydrochlorde, hydrobromide, hydroiodide, sulfate, sulfamate and phosphate and the organic acid addition salts such as the maleate, acetate, citrate succinate, benzoate, tartrate, fumarate, malate, mandelate, scorbate and the like.

The products of the present invention are prepared in a two step process:

Step 1: A compound of the formula

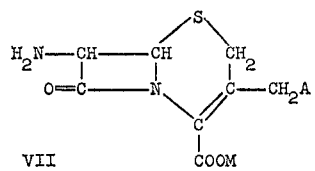

VII wherein A and M are described above (preferably in the form of a neutral salt or the triethylamine salt) is mixed with an acid halide having the formula

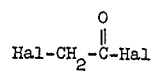

in which Hal is chloro, bromo or iodo, or with its functional equivalent as an acylating agent for a primary amino group, to produce a compound having the formula

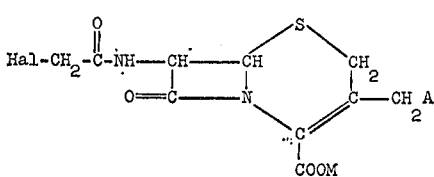

VIII in which Hal, A and M are as above.

The preferred acylating agent is a haloacetyl halide, most preferably bromoacetyl bromide.

Functional equivalents include the corresponding acid anhydrides, including mixed anhydrides and particularly the mixed anhydrides prepared from acids such as the lower aliphatic monoesters of carbonic acid, of alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with 7-aminocephalosporanic acid after first reacting said free acid with N,N'-dimethylchloroformiminium chloride [cf. Great Britain 1,008,170 and Novak and Weichet, Experientia XXI, 6, 360, (1965)] or by the use of enzymes or of an N,N'-carbonyldiimidazole or an N,N'-carbonylditriazole [cf. South African patent specification 63/2,684] or a carbodiimide reagent [especially N,N'-dicyclohexylcarbodiimide, N,N'-diisopropylcarbodiimide or N-cyclohexyl-N'-(2-morpholinoethyl)carbodiimide; cf. Sheehan and Hess, J. Amer. Chem. Soc. 77, 1067, (1955)], or of alkynylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc. 80, 4065)] or of an isoxazolium salt reagent [cf. R. B. Woodward, R. A. Olofson and H. Mayer, J. Amer. Chem. Soc. 83, 1010 (1961)]. Another equivalent of the acid chloride is a corresponding azolide, i.e., an amide of the corresponding acid whose amide nitrogen is a member of an quasiaromatic five-membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolide. The by-product, imidazole, may be separated and the imidazolide isolated, but this is not essential. The methods for carrying out these reactions to produce a cephalosporin and the methods used to isolate the cephalosporin so-produced are well-known in the art (cf. U.S. Patents Nos. 3,079,314, 3,117,126 and 3,129,224 and British Patents Nos. 932,644, 957,570 and 959,054).

Step 2: The second step of the process is performed by mixing together material having the Formula VIII with a mercaptan having the formula

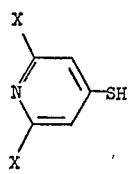

IX in which X is chloro or fluoro, preferably in the presence of a base, in aqueous or non-aqueous media to produce the compounds of the present invention.

The starting materials used in the present invention include 7-aminocephalosporanic acid and derivatives of 7-aminocephalosporanic acid. 7-aminocephalosporanic acid is prepared by hydrolysis of cephalosporin C and has the formula

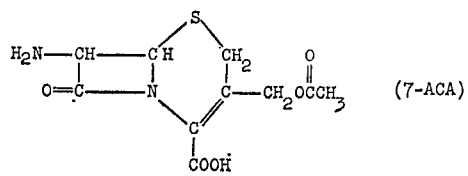

X 7-amino-3-methyl-3-cephem-4-carboxylic acid having the formula

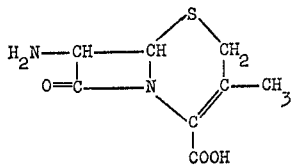

XI is produced by catalytic reduction of cephalosporin C followed by hydrolytic removal of the 5-aminoadipoyl side chain as described in U.S. Patent No. 3,129,224.

3-azidomethyl-7-amino-3-cephem-4-carboxylic acid having the formula

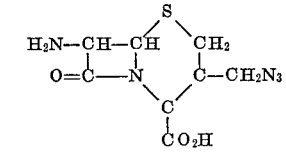

XII is described by British patent specifications 1,101,422 and 1,104,938. The product can be prepared by the direct treatment of 7-ACA with p-toluene sulfonic acid monohydrate followed by treatment with sodium azide, or by the treatment of cephalosporin C with sodium azide followed by chemical cleavage as described in U.S. patents.

The process for the preparation of the compounds of the instant invention is usually performed by dissolving a one molar quantity of a compound having the Formula X, XI or XII in a 2:1 water-acetone solution which is buffered with 3 moles of a bicarbonate.

The solution is rapidly stirred and cooled to 0° C. and one mole of a haloacetyl halide, preferably bromoacetyl bromide, is added rapidly. The temperature is maintained at 0°–5° C. for ten minutes and then stirred for an additional one hour as the temperature is allowed to approach 25° C. The mixture is concentrated in vacuo at 20° C. to about one-half volume and then doubled in volume by the addition of water. Two ether extractions are made and the ether extracts discarded. The aqueous solution is covered by a layer of ethyl acetate or its equivalent, stirred and cooled during which time the solution is acidified to pH 2 by the addition of 40% $H_3PO_4$.

The mixture is filtered and the ethyl acetate layer separated, washed with water, dried over sodium sulfate, filtered, and then treated with a solution of sodium or potassium 2-ethylhexanoate (SEH-KEH) in n-butanol. The oil which forms is scratched to induce crystallization. The resultant crystals are collected, washed several times with acetone and dried in vacuo over $P_2O_5$ to yield sodium or potassium 7ä(α-bromoacetamido)-cephalosporanate when the starting material is compound X and the corresponding derivative when the starting material is compound XI or XII.

When the acid form of the salts is desired, a quantity of the sodium or potassium salt is dissolved in 1:1 acetone-water and slowly acidified to pH 2.0 with vigorous scratching and stirring. The free acid crystallizes upon standing and cooling with stirring.

Step 2 of the process for the preparation of the compounds of the instant invention is usually performed by either of two methods.

(A) Aqueous (wet method): The sodium or potassium salt of the 7-(α-bromoacetamido) derivative obtained in step 1 is dissolved in a solution of sodium bicarbonate containing an equimolar quantity of sodium bicarbonate. An equimolar quantity of the mercaptan IX is added rapidly at about room temperature and the reaction mixture is stirred for about 30 minutes to 120 minutes. The mixture is extracted several times with ethyl acetate and the aqueous phase is acidified to pH 2 with a mineral acid such as HCl, $H_3PO_4$, or the like. The aqueous phase is again extracted with ethyl acetate and then extracted with "aerosol OT" in MIBK. The MIBK phase is washed with water, dried over $Na_2SO_4$, filtered and the pH adjusted to 6 with TEA (triethylamine). A solid crystallizes upon scratching to yield the product corresponding to the starting materials.

(B) Anhydrous (dry method): The acid form of the 7-(α-bromoacetamido) derivative obtained in step 1 is dissolved in $CH_2Cl_2$ containing an equimolar quantity of TEA. An equimolar quantity of the mercaptan IX is added rapidly at about room temperature. After stirring for about 30 minutes to 120 minutes, a solid crystallized which was collected by filtration to produce the desired product corresponding to the starting materials.

In the process for the preparation of the compounds of Formulae I and VIII above, the compounds are sometimes in aqueous solution in the form of their sodium or potassium salt. These compounds in the aqueous phase can then be converted to the free acid, preferably in the cold under a layer of organic solvent by the addition of mineral acid, e.g. 40% $H_3PO_4$ to pH 2–3. The free acid can then be extracted into a water-immiscible, neutral organic solvent such as ethyl acetate, the extract washed with water quickly in the cold, if desired, and dried, as with anhydrous $Na_2SO_4$ and the free acid recovered from the organic solvent solution. The product in the ethyl acetate extract in its free acid form can then be converted to any desired metal or amine salt, particularly the pharmaceutically acceptable nontoxic amine salts described above, by treatment with the appropriate base, e.g. a free amine such as procaine base or a solution of potassium 2-ethylhexanoate in dry n-butanol. These salts are usually insoluble in solvents such as ethyl acetate and can be recovered in pure form by simple filtration.

The objectives of the present invention have been achieved, by the provision according to the present invention of the process for the synthesis of 7-[α-(2,6-dihalo-4-pyridylthio)acetamidocephalosporanic acids or derivatives thereof which comprises the consecutive steps of (a) Mixing together a compound having the formula

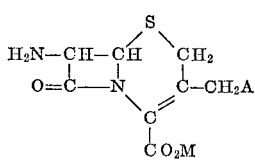

VII wherein A is hydrogen, (lower)alkanoyloxy, benzoyloxy or azido; and

M is hydrogen or a pharmaceutically acceptable nontoxic cation, with about 1 to about 1.5 molar equivalents, but preferably about 1 molar equivalent, of an α-haloacetylhalide having the formula

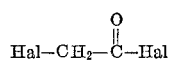

wherein Hal is selected from the group consisting of chloro, bromo ad iodi, but is preferably bromo, or its functional equivalent as an acylating agent for a primary amino group in the presence of about 1 to 4.0 molar equivalents, of a base selected from the preferably 2 or 3 molar equivalents of a base selected from the group consisting of alkali metal carbonates and bicarbonates, i.e., $NaHCO_3$, $Na_2CO_3$, $KHCO_3$, $K_2CO_3$, etc., or pyridine in a water-miscible ketonic solvent system such as water in combination with acetone, methyl isobutyl ketone (MIBK), butanone, etc., but preferably with acetone, at a temperature of about −20° C. to +50° C., but preferably in the range of 0° C. to 25° C., to produce a compound having the formula

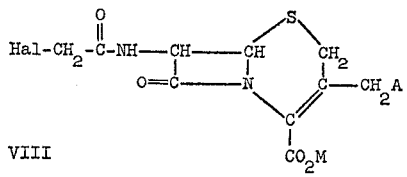

VIII wherein Hal, A and M are as described above, and (b) Mixing said α-haloacetamido compound VIII with about 1 to 1.5 molar equivalents, but preferably about one molar equivalent, of a mercaptan having the formula

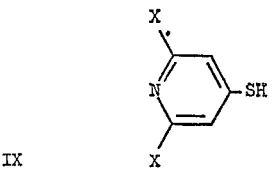

IX in which X is as defined above; in an organic solvent selected from the group consisting of methylene chloride, chloroform, dimethylformamide, dioxane, tetrahydrofuran, methyl isobutyl ketone, but preferably methylene chloride, in the presence of a base, preferably an organic base selected from the group consisting of (lower)trialkylamines and pyridines, but preferably triethylamine, in a molar ratio of about 1 to about 3 molar equivalents of base to 1 molar equivalent of compound VIII, but preferably in a 1:1 ratio, at a temperature in the range of about −20° C. to about 50° C., but preferably at about room temperature, to produce the product having the formula

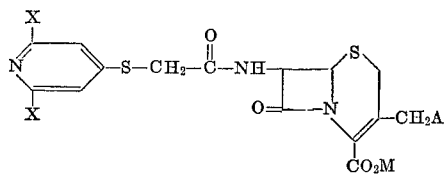

I wherein X, A and M are as described above.

In the treatment of bacterial infections in man, the compounds of this invention are administered orally or parenterally, but preferably parenterally, in accordance with conventional procedures for antibiotic administration, in an amount of from about 5 to 200 mg./kg./day and preferably about 20 mg./kg./day in divided dosage, e.g., three to four times a day. They are administered in dosage units containing, for example, 125 or 250 or 500 mg. of active ingredient with suitable physiologically acceptable carriers or excipients. The dosage units can be in the form of liquid preparations such as solutions, dispersions or emulsions or in solid form such as tablets, capsules, etc.

The cephalosporins of the present invention have shown in vitro antimicrobial activity against many strains of microorganisms. In particular, the compound 7-[α-(2,6-dichloro - 4 - pyridylthio)acetamido]cephalosporanic acid (XXI) has shown exceptional activity against *Mycobacterium tuberculosis* H37Rv.

As an illustration, the antitubercular activity of compound XXI was compared to that of the most closely related compounds of the prior art as previously cited in the introduction: 7-[α-(4-pyridylthio)acetamido]cephalosporanic acid (XXII) and 7-[α(4-pyridyl-N-oxide-thio)acetamido]cephalosporanic acid (XXIII). Cephalothin and 7-[α-(3,5-dichloro-4-pyridylthio)acetamido]-cephalosporanic acid (XXIV) were also included for comparative purposes. The results are shown in Table I.

The following procedure was used for assaying the cephalosporins for their anti-H37Rv activity by the tube dilution method.

(1) The *Mycobacterium tuberculosis* H37Rv culture was grown for 5 to 7 days at 37° C. in Dubos medium, and then diluted to 2.0% by volume in sterile medium for a working innoculum. It is used at the rate of 3.5 ml. per 0.5 ml. medicated Dubos medium in test tubes (15 x 150 mm.).

(2) A known quantity of the cephalosporin to be tested is dissolved in an appropriate solvent system (usually water or 5% sodium bicarbonate or dimethylsulfoxide or mixtures thereof) to provide a stock solution. The stock solution is diluted serially two-fold in sterile Dubos medium in 15 x 150 ml. sterile test tubes. The medicated tubes of broth are seeded as described above (part 1), and incubated for 5–7 days at 37° C. Dihydrostreptomycin sulfate is used to check the sensitivity of the H37Rv culture. Under these conditions, steptomycin has a minimum inhibitory concentration value of about 0.8 μg./ml.

Dubos media is prepared in two steps:

(A) Dubos liquid tween medium:

| | Percent |
|---|---|
| Asparagine | 0.1 |
| $Na_2HPO_4$ | 0.63 |
| $KH_2PO_4$ | 0.1 |
| Ferric ammonium citrate | 0.01 |
| Sodium citrate | 0.15 |
| $MgSO_4$ | 0.06 |
| Tween | 0.05 |
| Water, q.s. ad. | |

Adjust pH to 6.8–7.0, then sterilize by autoclaving 15–20 minutes at 15 p.s.i.

(B) Dubos albumin solution:

| | Percent |
|---|---|
| Bovine albumin fraction V | 5 |
| $Na_3PO_4 \cdot 12H_2O$ | 0.32 |
| NaCl | 0.87 |
| Water, q.s. ad. | |

Heat to 55° C. for 30 minutes to destroy any lypase present. Filter sterilized and add to sterile medium A above so that B constitutes 4% by volume. Incubate composite 1–2 days at 37° C. to check sterility before using.

TABLE I

[Minimum inhibitory concentration (μg./ml.) vs. *Mycobacterium tuberculosis* H37Rv]

| Compound | Complete inhibition | Partial inhibition |
|---|---|---|
| XXI | 0.4 | 0.1 |
| XXII | 6.3 | 1.6 |
| XXIII | 25 | |
| Cephalothin | 100 | 25 |
| XXIV | 3.2 | 1.6 |
| Dihydrostreptomycin sulfate | 0.8 | 0.2 |

It is apparent from the table above that the only compound in this series possessing anti-tubercular activity comparable to dihydrostreptomycin sulfate is 7-[α-(2,6-dichloro-4-pyridylthio)acetoamido]cephalosporanic acid (XXI).

Compound XXI is at least 15 times more potent than the 7-[α-(4-pyridylthio)acetamido]cephalosporanic acid derivatives (XXII and XXIII) of the prior art. Furthermore, compound XXI which possesses a 2,6-dichloro-4-pyridylthio-moiety is at least 8 times more potent than the related 3,5-dichloro-4-pyridylthio derivative (XXIII). It is therefore reasonable to assume 2,6-dihalo-substitution of the 4-pyridylthio moiety is essential for superior anti-tubercular activity.

PREPARATION OF STARTING MATERIALS (1) Preparation of sodium 7-(α-bromoacetamido) cephalosporanate

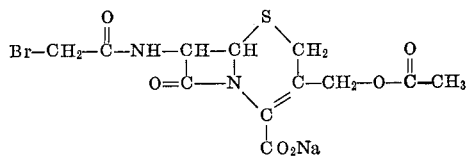

27.2 grams (0.1 mole) of 7-ACA, 33.2 grams (0.3 mole) of $NaHCO_3$, 200 ml. of water and 100 ml. of acetone were mixed together, cooled to 0° C. and stirred rapidly while 20.1 grams (0.1 mole) of bromoacetyl bromide dissolved in 100 ml. of acetone was added in one fast addition. The temperature was kept at 0°–5° C. for ten minutes, then the ice-salt bath was removed and stirring continued for one hour as the temperature approached 25° C. The mixture was concentrated in vacuo at 20° C. to one-half volume and 200 ml. of water added. Two 400 ml. ether extracts were made and discarded. The aqueous solution was covered with 200 ml. of ethyl acetate and vigorously stirred and cooled while being acidified to pH 2 with 40% phosphoric acid. The mixture was filtered, the ethyl acetate layer separated and washed with three 100 ml. portions of water, dried over $Na_2SO_4$, filtered and treated with 30 ml. of sodium 2-ethylhexanoate in n-butanol (34 ml.=0.1 mole). The oil which settled out was scratched to induce crystallization. After stirring for twenty minutes the product was scraped from the sides of the flask and collected. The filter cake was washed with several portions of acetone, air dried, and dried in vacuo over $P_2O_5$. The yield was 22.5 grams and decomposed at 193° C. The infrared (IR) and nuclear magnetic resonance (NMR) spectra were consistent with the above named compound, sodium 7-(α-bromoacetamido)cephalosporanate. (See U.S. Pat. 3,173,916).

*Analysis.*—Calc'd for $C_{12}H_{12}BrN_2O_6S \cdot Na$ (percent): C, 34.70; H, 2.92. Found (percent): C, 32.43; H, 2.86. Karl Fischer water=0.93%.

(2) Preparation of sodium 7-(α-bromoacetamido)-3-methyl-3-cephem-4-carboxylate

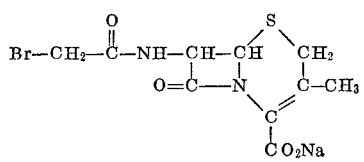

Substitution in procedure 1 above for the 7-ACA used therein of an equimolar quantity of 7-amino-3-methyl-3-cephem-4-carboxylic acid produced sodium 7-(α-bromoacetamido)-3-methyl-3-cephem-carboxylate, 22.4 g., M.P. 217° C. with decomposition.

(3) Conversion of sodium salts to free acids

The sodium salts of the compounds of the invention or starting materials thereof, i.e., sodium 7-(α-bromoacetamido)-cephalosporanate, sodium 3-azidomethyl-7-(α-bromoacetamido)-3-cephem-4-carboxylate and sodium 7-(α-bromoacetamido)-3-methyl - 3 - cephem-4-carboxylate, are converted to their free acid forms by dissolving them in 1:1 water-acetone, acidifying to about pH 2.0 with a strong numeral acid, e.g., $H_3PO_4$, HCl and the like. The product will crystallize upon scratching with a glass rod and is collected by filtration. However, if the product oils out of solution, then extract with MIBK, dry over sodium sulfate, concentrate in vacuo, add acetone to the cloud point and scratch with a glass rod to induce crystallization. Cool for several hours and collect the crystals by filtration. (Also see U.S. Pat. No. 3,173,916).

(4) Preparation of 2,6-dichloro-4-mercaptopyridine (A) 2,6-dichloropyridine-1-oxide.—Ref: R. J. Rousseau and R. K. Robins, J. Heterocyclic Chemistry, 2 (2), pp. 196–201 (1965), England.

Two hundred (200 g.) grams of trifluoroacetic acid, 16 g. of 2,6-dichloropyridine and 22.5 ml. of 30% hydrogen peroxide were heated on a steam bath for 4 hours. The solution was cooled and diluted with 1500 ml. of water. A precipitate formed which was removed by filtration. It was determined to be unreacted 2,6-dichloropyridine. The filtrate was evaporated in vacuo to near dryness and 500 ml. of chloroform was added to the residue. The solution was treated with anhydrous sodium carbonate until the evolution of carbon dioxide ceased. The mixture was filtered and the chloroform filtrate was evaporated to dryness to yield 9.45 g. of colorless 2,6-dichloropyridine-1-oxide. The product was recrystallized from a mixture of benzene and heptane, M.P. 137–140° C. The 2,6-dichloropyridine was purchased from Aldrich Chemical Company.

(B) 2,6-dichloro-4-nitropyridine-1-oxide

Ref: As above in part (A).

Concentrated sulfuric acid (200 ml.) was added dropwise to 100 ml. of 90% nitric acid with stirring and cooling with maintenance of the temperature at +5° C. The 2,6-dichloropyridine-1-oxide was added to the acid mixture in small portions. The resultant solution was heated on a steam bath for two hours and poured onto 650 g. of crushed ice. The solution was neutralized with concentrated ammonium hydroxide (approximately 700 ml.) while the temperature was maintained below 30° C. The product precipitated upon cooling for about 15 hours to yield 8.9 gm. of title compound, M.P. 175–178° C.

(C) 4-amino-2,6-dichloropyridine

Ref: As above in part (A). Also H. Meyer and E. Van Beck, Monatsh, 36, 731 (1915).

2,6-dichloro-4-nitropyridine (17 g.) was dissolved in 500 ml. of methanol containing 15 g. of Raney nickel and was hydrogenated at 50 lbs./in.$^2$ for 4 hours at 22° C. temperature. The catalyst was removed by filtration and the solution evaporated to dryness in vacuo. After recrystallization from methanol and water, 9 g. of title product was obtained, M.P. 165–172° C.

(D) 2,4,6-trichloropyridine

Ref: H. J. Den Hertog, J. C. Schoge, J. De Bruyn and A. De Klerk, Rec. tran. chim., 69 pp. 673–699 (1950).

4-amino-2,6-dichloropyridine (2.0 g.) was dissolved in 80 ml. of concentrated HCl. The solution was cooled in ice and saturated with HCl gas. Sodium nitrite (3.05 g.) was added in small quantities and the mixture was allowed to stand at room temperature for one-half hour. The mixture was diluted with 100 ml. of water and distilled by steam distillation to produce 1.65 g. of yellow crystals of the desired product, M.P. 30–33° C.

(E) 2,6-dichloro-4-mercaptopyridine

Hydrogen sulfide gas was bubbled into a stirred solution of 2.67 g. (0.0423 mole) of potassium hydroxide pellets in 100 ml. of methanol at 5° C. at a vigorous rate until the solution was saturated. 2,4,6-trichloropyridine (7.7 g., 0.0423 mole) was added and the mixture stirred with the ice bath removed until solution was obtained. The solution was then heated at reflux for one hour and the methanol removed by vacuum distillation at 20° C. (bath temperature). The residue was dissolved by 50 ml. of water and the unreacted 2,4,6-trichloropyridine removed by extraction with three 50 ml. portions of chloroform. The aqueous solution was stripped of dissolved CHCl$_3$ under reduced pressure at 20° C. The aqueous solution was then acidified to pH 3.5 with acetic acid, cooled and the crystalline product filtered off. After washing with cold water, the product was air dried and finally vacuum dried over P$_2$O$_5$. Yield was 2.8 g., M.P. 113°–114° C.

The nuclear magnetic resonance (NMR) and infrared (IR) spectra were entirely consistent with the desired structure. The NMR showed a symmetrical peak for the aromatic protons indicating substitution (—SH) in the 4-position.

*Analysis.*—Calc'd for C$_5$H$_3$Cl$_2$NS (percent): C, 33.33; H, 1.67; Cl, 39.38. Found (percent): C, 33.55; H, 2.01; Cl, 39.17.

(5) Preparation of 2,6-difluoro-4-mercaptopyridine

Substitution in the procedure of number (4) above, for the 2,6-dichloropyridine used therein (part A) of an equimolar quantity 2,6-difluoropyridine ultimately produces 2,6-difluoro-4-mercaptopyridine.

(6) Preparation of 3,5-dichloro-4-mercaptopyridine (A) 3,5-dichloro-4-hydroxypyridine.—Ref: M. Dohm and P. Diedrich, Ann, 494, pp. 284–302 (1932).

4-hydroxypyridine (21 g.) was dissolved in 1009 ml. of concentrated hydrochloric acid and 200 ml. of water was added. Chlorine gas was bubbled into the solution and a precipitate began to form. Chlorine gas was bubbled in an additional 30 minutes and the crystalline solid that formed was collected by filtration. The solid was washed with water and air dried to produce 7.2 g. of title product.

In subsequent experiments it was found that only two moles of chlorine gas per mole of 4-hydroxypyridine should be used to prevent further chlorination of the pyridine nucleus.

(B) 3,4,5-trichloropyridine: Ref: As above in 6, part A.

3,5-dichloro-4-hydroxypyridine (7.0 g.) was heated at 125° C. with 7 ml. of JOCl$_3$ and 10 g. of PCl$_5$ for two hours. The excess POCl$_3$ was removed in vacuo and the residue poured into ice-water. The solid residue was collected and recrystallized from ethanol-water (1:1) to produce 6.6 g. of the title compound, M.P. 74–75° C.

(C) 3,5-dichloro-4-mercaptopyridine: Ref: As above in 6, part A.

A solution of 4.56 g. (0.072 mole) of potassium hydroxide in 95% ethanol (200 ml.) was saturated at 5° C. with hydrogen sulfide gas. To this solution was added 6.47 g. (0.036 mole) of 3,4,5-trichloropyridine and the mixture was heated for one hour on a steam bath at gentle reflux. The ethanol was removed in vacuo and the crystalline residue dissolved in 50 ml. of water. About 0.6 g. of starting material, 3,4,5-trichloropyridine was removed by filtration. The filtrate was acidified with glacial acetic acid to produce 4.1 g. of yellow crystals of the title product, M.P. 189° C.

(7) Preparation of sodium 3-azidomethyl-7-($\alpha$-bromoacetamido)-3-cephem-4-carboxylate Bromoacetyl bromide (5 g., 0.028 mole) was added with vigorous stirring to a cooled (0° C.) solution of 5 grams (0.02 mole) of 3-azidomethyl-7-amino-3-cephem-4-carboxylic acid, 5 grams of NaHCO$_3$, 50 ml. of water and 25 ml. of acetone over a 5 minute period. After 30 minutes the solution was diluted with an equal volume of water and then extracted with a 200 ml. portion of ether which was discarded. The aqueous layer was cooled and acidified to pH 2 with 40% H$_3$PO$_4$ under a layer of ethyl acetate (100 ml.). The ethyl acetate layer was washed with water, dried over anhydrous sodium sulfate, filtered and treated with 0.02 moles of sodium ethylhexanoate in n-butanol. The ethyl acetate was partially removed in vacuo at 20° C. until the product partially crystallized. The product was cooled, filtered and the solid dried to yield 2 grams of the title compound.

The following examples will serve to illustrate this invention without limiting it thereto. All temperatures are given in degrees centigrade.

EXAMPLE 1

Preparation of 7-[α-(2,6-dichloro-4-pyridylthio)acetamido]cephalosporanic acid

Triethylamine (1.4 ml., 0.01 mole) was added to a stirred suspension of 3.93 g. (0.01 mole) of 7-[α-bromoacetamido)cephalosporanic acid in 40 ml. of methylene chloride at room temperature. To the resulting solution was added 1.80 g. (0.01 mole) of 2,6-dichloro-4-mercaptopyridine and after 2 hours at 22° C. the crystalline product which had precipitated was filtered off, washed with six 25 ml. portions of methylene chloride, air dried and vacuum dried over $P_2O_5$ to give 3.58 g., dec. pt. 190° C. (slowly), of the title product. The IR and NMR spectra were entirely consistent with the desired structure.

*Analysis.*—Calc'd for $C_{17}H_{15}Cl_2N_3O_6S_2$ (percent): C, 41.46; H, 3.07; N, 8.56. Found (percent): C, 41.25; H, 3.31; N, 8.63.

EXAMPLE 2

Preparation of 7[α-(2,6-difluoro-4-pyridylthio)acetamido]cephalosporanic acid

Substitution in the procedure of Example 1 for the 2,6-dichloro-4-mercaptopyridine used therein of an equimolar quantity of 2,6-difluoro-4-mercaptopyridine produces 7-[α-(2,6 - difluoro - 4 - pyridylthio)acetamido]cephalosporanic acid.

EXAMPLE 3

Preparation of 3-azidomethyl-7-[α-(2,6-dichloro-4-pyridylthio(acetamido-3-cephem-4-carboxylic acid Substitution in the procedure of Example 1 for the 7-[α-(bromoacetamido]cephalosporanic acid used therein of an equimolar quantity of 3-azidomethyl-7-α-bromoacetamido)-3-cephem-4-carboxylic acid produces the title compound.

EXAMPLE 4

Preparation of 7-[α-(2,6-dichloro-4-pyridylthio)acetamido]-3-methyl-3-cephem-4-carboxylic acid Substitution in the procedure of Example 1 for the 7-(α-bromoacetamido)cephalosporanic acid used therein of an equimolar quantity of 7-(α-bromoacetamido)-3-methyl-3-cephem-4-carboxylic acid produces the title compound.

EXAMPLE 5

Preparation of 7-[α-(2,6-difluoro-4-pyridylthio)acetamido]-3-methyl-3-cephem-4-carboxylic acid Substitution in the procedure of Example 1 for both the 7-(α-bromoacetamido)cephalosporanic acid and the 2,6-dichloro-4-mercaptopyridine used therein of equimolar quantities of 7-(α-bromoacetamido)-3-methyl-3-cephem-4-carboxylic acid and 2,6-difluoro-4-mercaptopyridine respectively produces the title product.

EXAMPLE 6

Preparation of 3-azidomethyl-7-[α-(2,6-difluoro-4-pyridylthio(acetamido]-3-cephem-4-carboxylic acid Substitution in the procedure of Example 1 for both the 7-(α-bromoacetamido)cephalosporanic acid and the 2,6-dichloro-4-mercaptopyridine used therein of equimolar quantities of 3 - azidomethyl-7-(α-bromoacetamido)-3-cephem-4-carboxylic acid and 2,6-difluoro-4-mercaptopyridine produces the title compound.

EXAMPLE 7

Preparation of 7-[α-(3,5-dichloro-4-pyridylthio)acetamido]cephalosporanic acid

Triethylamine (1.4 ml., 0.01 mole) was added to a stirred suspension of 7-(α-bromoacetamido)cephalosporanic acid (3.93 g., 0.01 mole) in 40 ml. of methylene chloride followed by the addition of 1.8 g. (0.01 mole) of 3,5-dichloro-4-mercaptopyridine. The solution was stirred for about two hours at room temperature and the crystalline product that formed was collected by filtration, washed with methylene chloride and air dried. The solid was recrystallized from acetone-water (1:1) to produce 2.13 g. of title compound, M.P. with decomposition 181° C.

*Analysis.*—Calc'd for $C_{17}H_{15}Cl_2N_3O_6S_2$ (percent): C, 41.46; H, 3.07; N, 8.56. Found (percent): C, 41.41; H, 3.34; N, 8.74.

Karl Fischer water=0.8%.

EXAMPLE 8

Preparation of sodium 7-[α-(2,6-dichloro-4-pyridylthio)acetamido]cephalosporanate 7-[α - (2,6 - dichloro - 4 - pyridylthio)acetamido]cephalosporanic acid (79 g.) was dissolved in 1200 ml. of acetone and 250 ml. of water. The solution was filtered and treated with 70 ml. (0.2 mole) of sodium 2-ethylhexanoate in n-butanol (35 ml.=0.1 mole). The resultant slurry was stirred for one hour at 22° C. and the crystalline sodium salt was collected by filtration. The crystals were washed with 3× 100 ml. of acetone, 3× 300 ml. of diethyl ether and 3× 200 ml. of "Skellysolve B" (petroleum ether, essentially n-hexane) and then air dried. The yield was 60 g. After drying for 18 hours over $P_2O_5$ in vacuo, the yield was 58 g., decomp. point ≃ 150° C. darkens, 175° C. sharp decomposition.

*Analysis.*—Calc'd for $C_{17}H_{14}Cl_2N_3O_6S_2Na$ (percent): C, 39.69; H, 2.74; N, 8.17. Found (percent): C, 39.61; H, 2.98; N, 7.91.

I claim:
1. A compound having the formula

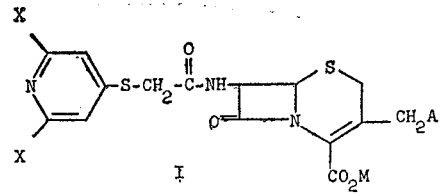

in which X is fluoro or chloro, A is hydrogen, azido, (lower)alkanoyloxy or benzyloxy; M is hydrogen or a pharmaceutically acceptable nontoxic cation; or a pharmaceutically acceptable nontoxic acid addition salt thereof when M is hydrogen.

2. The compounds of claim 1 having the formula

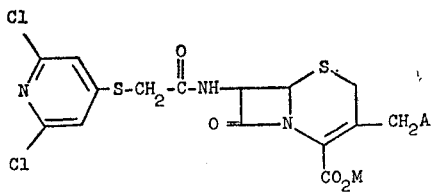

in which A is hydrogen, azido, or acetoxy; M is hydrogen or a pharmaceutically acceptable nontoxic cation.

3. The compounds of claim 2 in which A is hydrogen, azido or acetoxy and M is hydrogen, potassium or sodium.

4. The compounds of claim 2 in which A is hydrogen or acetoxy and M is hydrogen, potassium or sodium.

5. 7-[α(2,6-dichloro - 4 - pyridylthio)acetamido]cephalosporanic acid.

6. The potassium or sodium salt of the compound of claim 5.

7. The compounds of claim 1 having the formula

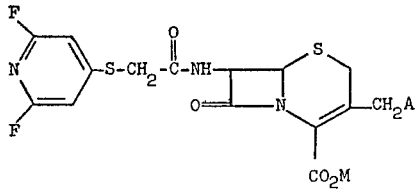

in which A is hydrogen, azido, or acetoxy; M is hydrogen or a pharmaceutically acceptable nontoxic cation.

8. The compounds of claim 7 in which A is hydrogen, azido or acetoxy and M is hydrogen, potassium or sodium.

9. The compounds of claim 7 in which A is hydrogen or acetoxy and M is hydrogen, potassium or sodium.

10. 7-[α-(2,6-difluoro - 4 - pyridylthio)acetamido]cephalosporanic acid.

11. The sodium or potassium salt of the compound of claim 10.

References Cited
UNITED STATES PATENTS

| | | | |
|---|---|---|---|
| 3,422,100 | 1/1969 | Crast | 260—243 C |
| 3,499,893 | 3/1970 | Crast | 260—243 C |
| 3,503,967 | 3/1970 | Silvestri et al. | 260—243 C |

NICHOLAS S. RIZZO, Primary Examiner

U.S. Cl. X.R.

424—246